United States Patent [19]

Bedard et al.

[11] Patent Number: 4,644,498

[45] Date of Patent: Feb. 17, 1987

[54] FAULT-TOLERANT REAL TIME CLOCK

[75] Inventors: James F. Bedard, Schenectady; Vijay C. Jaswa, Clifton Park, both of N.Y.

[73] Assignee: General Electric Company, Schenectady, N.Y.

[21] Appl. No.: 780,539

[22] Filed: Sep. 26, 1985

Related U.S. Application Data

[63] Continuation of Ser. No. 481,958, Apr. 4, 1983, abandoned.

[51] Int. Cl.$^4$ .................................................. G06F 1/04
[52] U.S. Cl. ...................................... 364/900; 371/36; 371/61; 307/219
[58] Field of Search ..................... 371/36, 61, 62, 68, 371/4, 11, 28; 364/701, 200 MS File, 900 MS File; 307/441, 442, 464, 219

[56] References Cited

U.S. PATENT DOCUMENTS

| | | | |
|---|---|---|---|
| 3,467,956 | 9/1969 | Moreines | 340/658 |
| 3,803,568 | 4/1974 | Higashide | 371/8 |
| 3,829,703 | 8/1974 | Wilkie | 307/219 |
| 3,900,741 | 8/1975 | Fletcher et al. | 328/61 |
| 4,084,232 | 4/1978 | Woods et al. | 364/200 |
| 4,096,396 | 6/1978 | Belforte et al. | 371/68 |
| 4,164,629 | 8/1979 | Ollivier et al. | 179/15 BS |
| 4,239,982 | 12/1980 | Smith et al. | 307/219 |
| 4,266,145 | 5/1981 | Amacher et al. | 307/200 A |
| 4,480,198 | 10/1984 | Gass | 307/269 |
| 4,490,581 | 12/1984 | Edwards et al. | 179/18 EE |

FOREIGN PATENT DOCUMENTS 471691 8/1975 U.S.S.R. .................................... 371/36

OTHER PUBLICATIONS

Smith, T. B., "Fault-Tolerant Clocking System," Dig. of 11th IEEE Int. Symp. on Fault-Tolerant Computing, 1981, pp. 262-264.
Lewis, D. W., "A Fault-Tolerant Clock Using Standby Sparing," Dig. of 9th IEEE Int. Symp. on Fault-Tolerant Computing, 1979, pp. 33-39.
National Semiconductor, Data Book, "CD4018BM/CD4018BC Presettable Divide-by-N Counter".
D. Davies, J. F. Wakerly, "Synchronization and Matching in Redundant Systems," IEEE Trans. Comput, C-27, 6, Jun. 1978, pp. 531-539.
Moreines et al., "Majority Voting Protects Aircraft and Pilot," Electronics, vol. 37, No. 16, May 1964, pp. 85-91.
Short, Kenneth, "Microprocessors and Programmed Logic," 1981, Prentice Hall, Englewood Cliffs, N.J., pp. 312-314.
Wakerly, John, "Microcomputer Reliability Improvement Using TMR," Proceedings of the IEEE, vol. 64, No. 6, Jun. 1976, pp. 889-895.
Ingle et al., "A Reliability Model for Various Switch Designs in Hybrid Redundancy," IEEE Transactions on Computers, vol. C-25, No. 2, Feb. 1976, pp. 115-127.

*Primary Examiner*—Gareth D. Shaw
*Assistant Examiner*—Jonathan C. Fairbanks
*Attorney, Agent, or Firm*—Donald R. Campbell; James C. Davis, Jr.; Paul R. Webb, II

[57] ABSTRACT

Three hardware real time clock subcircuits are connected in a triple modular redundancy configuration to assure continued operation if one subcircuit fails. A power supply or processor failure will not cause a clock supplying other processors to fail. Output of voted master clock pulses to the counter in every subcircuit is inhibited until all power supplies are turned on and stabilized, and the time base of the real time clock pulses is variable. The output pulses of all subcircuits are voted on and the voter output is the real time clock. The master clock can be the processor clock.

6 Claims, 4 Drawing Figures

FAULT-TOLERANT REAL TIME CLOCK

This application is a continuation, of application Ser. No. 481,958, filed Apr. 4, 1983 now abandoned.

BACKGROUND OF THE INVENTION

This invention relates to fault-tolerant computer systems and more particularly to a hardware fault-tolerant real time clock and a method of synchronizing n such clocks (n=3, 5, 7, etc.) so that operation is maintained with a failure of (n-1)/2 of them.

Triple Modular Redundancy (TMR) is a type of fault tolerant system in which three identical machines work synchronously on the same task and their outputs are voted by hardware or software to provide a majority answer as output. Real time clocking for task periods is usually accomplished in software by use of flags. This produces a software overhead liability that reduces the efficiency of the machine. A hardware synchronized clock reduces this software overhead, increasing efficiency. This real time clock should continue to function properly in the face of both transient and hard faults in the system.

Literature references to fault-tolerant clocks deal with the production of high frequency clocks for processor clock applications in which the processors are run tightly synchronized.

SUMMARY OF THE INVENTION

A general object of the invention is to provide an improved, hardware fault-tolerant real time clock whose master clocks may have a dual function as the processor clocks.

A more specific object is the provision of a real time clock for modular redundant microcomputer systems with the following attributes:

1. Failure of a clock will not cause a system failure.
2. Failure of a power supply or processor will not cause a clock supplying other processors to fail.
3. The time base should be variable, say from 1 millisecond to 100 milliseconds.

These and other objects are realized by a clock that has n substantially identical real time clock subcircuits, where n=3, 5, 7, etc., that are interconnected and whose critical inputs and outputs are voted to assure continued operation with the failure of (n-1)/2 subcircuits. The illustrative embodiment is a triple modular redundant (n=3) configuration. Each subcircuit has a voted master clock which generates high frequency clock pulses and has as inputs its own signal and the signals from the other subcircuit master clocks, and counter or other means for producing therefrom real time clock pulses that have a selectable time period. Power up timeout circuitry has inputs from all subcircuits and temporarily inhibits production of real time clock pulses at least until all subcircuit power supplies are turned on and stabilized. A real time clock voter at the output has as inputs its own pulses and those from the other subcircuits.

Other features of the method of synchronizing n real time clocks are that voted master clock pulses are transmitted, after the power up timeout period, to a processor to be used as processor clock pulses, and that a reset signal is sent to the processor and counter means until a designated number of voted clock pulses are counted, allowing startup to begin in unison in all subcircuits. This assures compatibility with the proper power up routine of certain microprocessors. The voted real time clock pulses outputted by the subcircuit are fed back to the reset circuit to dynamically reset the counter means while other subcircuits are operating.

DETAILED DESCRIPTION OF THE INVENTION

Figure 1:
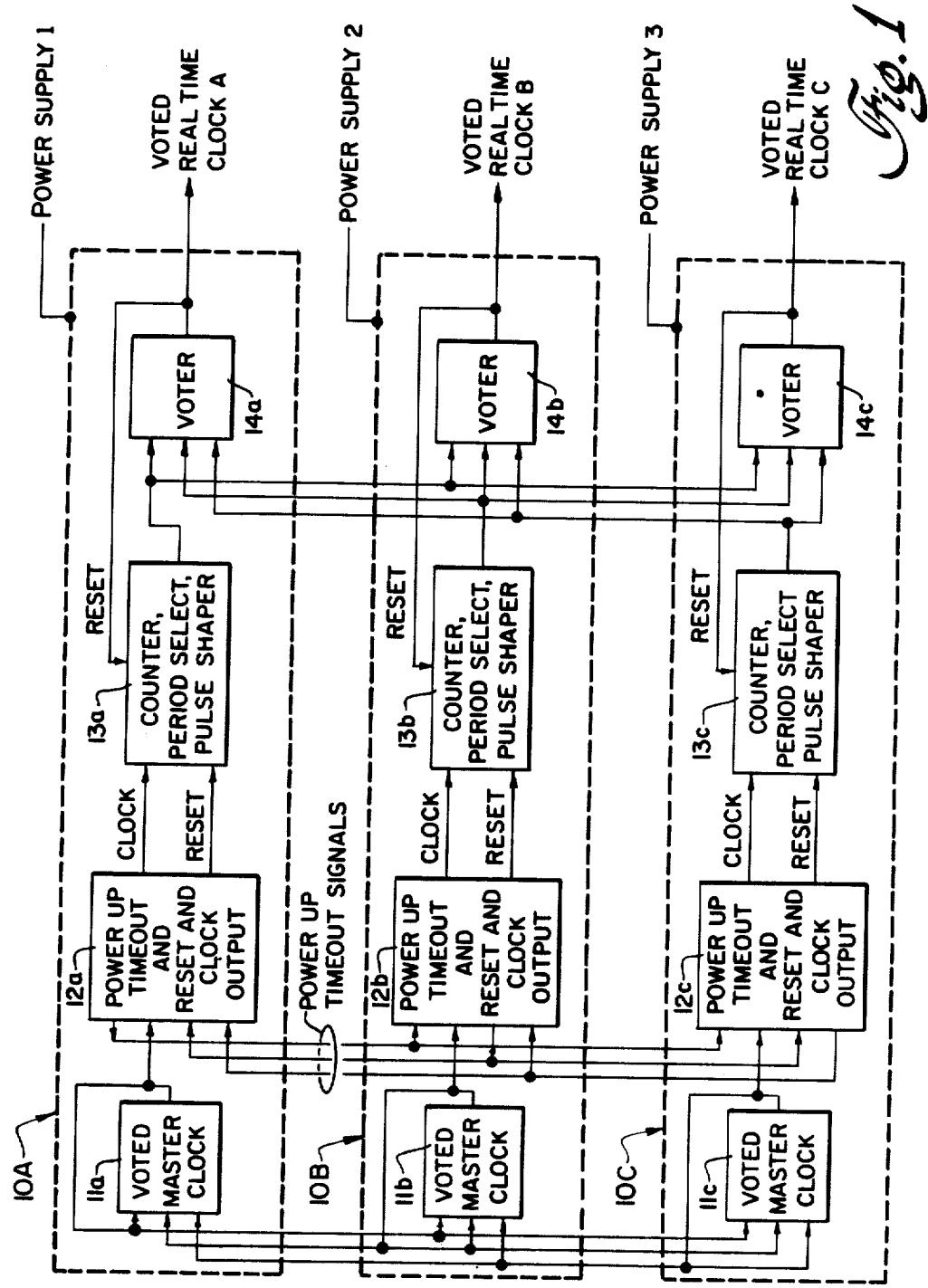
FIG. 1 is block diagram of a preferred embodiment of the fault-tolerant real time clock.

Referring to the block diagram of the circuit in FIG. 1, the three identical subcircuits 10A, 10B and 10C of the fault-tolerant real time clock are connected in a triple modular redundancy configuration. All critical inputs and outputs are voted to assure continued operation if one subcircuit fails. Each subcircuit is separately powered by power supplies common to the central processing unit associated with that subcircuit. This means a power supply failure will cause only one channel to fail, allowing the other two to continue proper operation.

An overview of the operation of subcircuit 10A is as follows; corresponding components in the other subcircuits are identified by the same numbers with "b" and "c" suffixes. The voted master clock 11a, say a 5 megahertz phase locked crystal clock, is applied to a power up timeout and reset and clock output circuit 12a that inhibits output to a counter 13a until all three power supplies have been turned on and have stabilized. A counter and processor reset signal is generated during this initial time out period plus a predetermined number of clock pulses, say 4 pulses, are output after the initial time-out. This is done to allow the master clock to be used as a processor clock, if desired, and ensures compatibility with the proper power up routine of an Intel or other processor which requires reset to be held for a specific number of clock cycles on power up. The reset signal and clock are applied to the counter 13a which begins countdown and produces sets of real time clock pulses with a variable time period, for example, 1, 2, 5, 10, 20, 50, 100 milliseconds. These separate signals are applied to a data selector or period select circuit 13a. The appropriate signal is selected and applied to a pulse shaper 13a such as a one shot which produces a 100 microsecond wide pulse at the selected frequency. The output pulses from all three subcircuits 10A, 10B and 10C are voted on and the output of the majority voter 14a becomes the real time clock A. Similarly, the output of subcircuits 10B and 10C are the voted real time clock B and voted real time clock C. All three outputs are continuously produced despite the failure of one complete subcircuit.

Figure 2A:
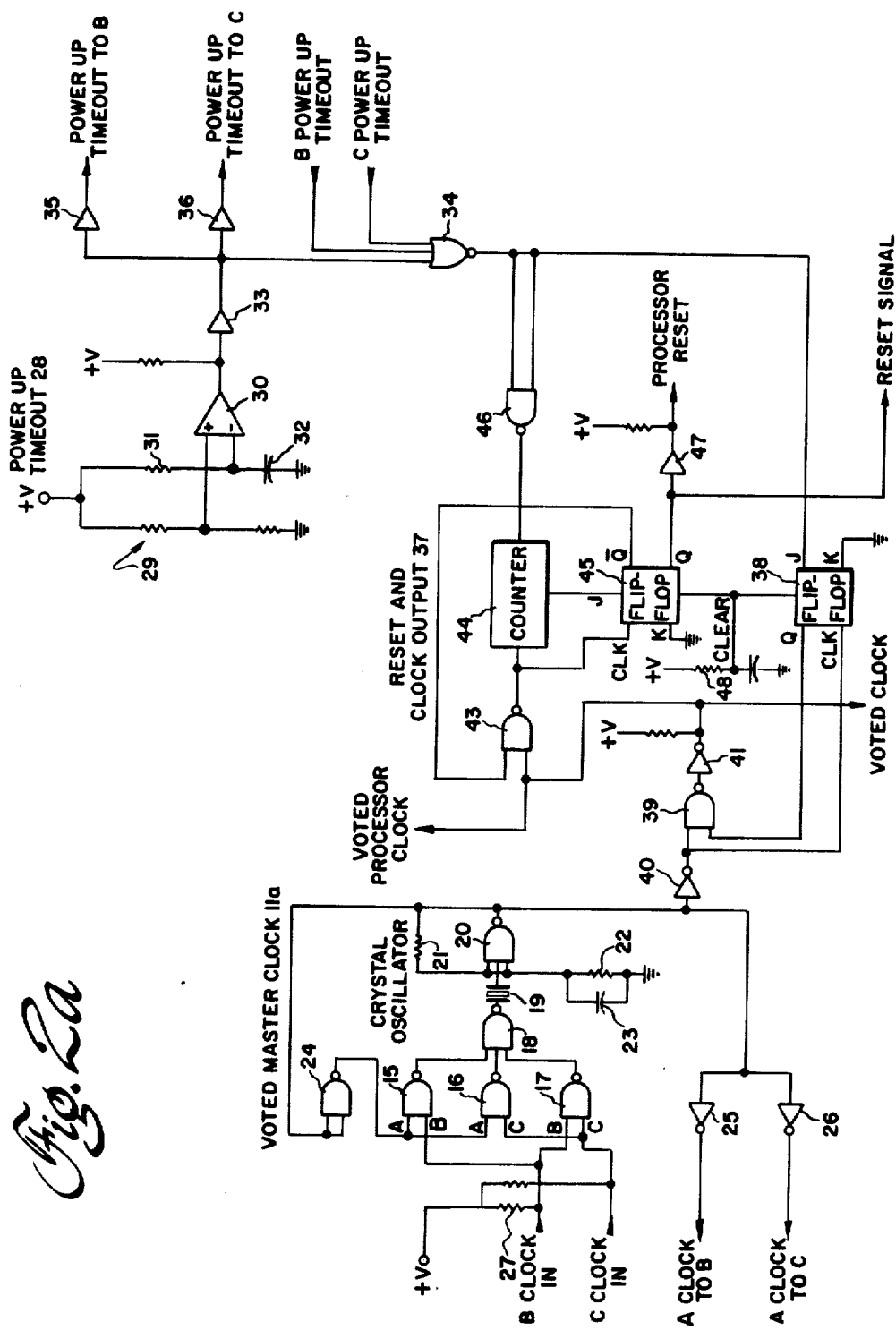
FIGS. 2a and 2b are a simplified schematic diagram of one of the three identical clock subcircuits.
Figure 2B:
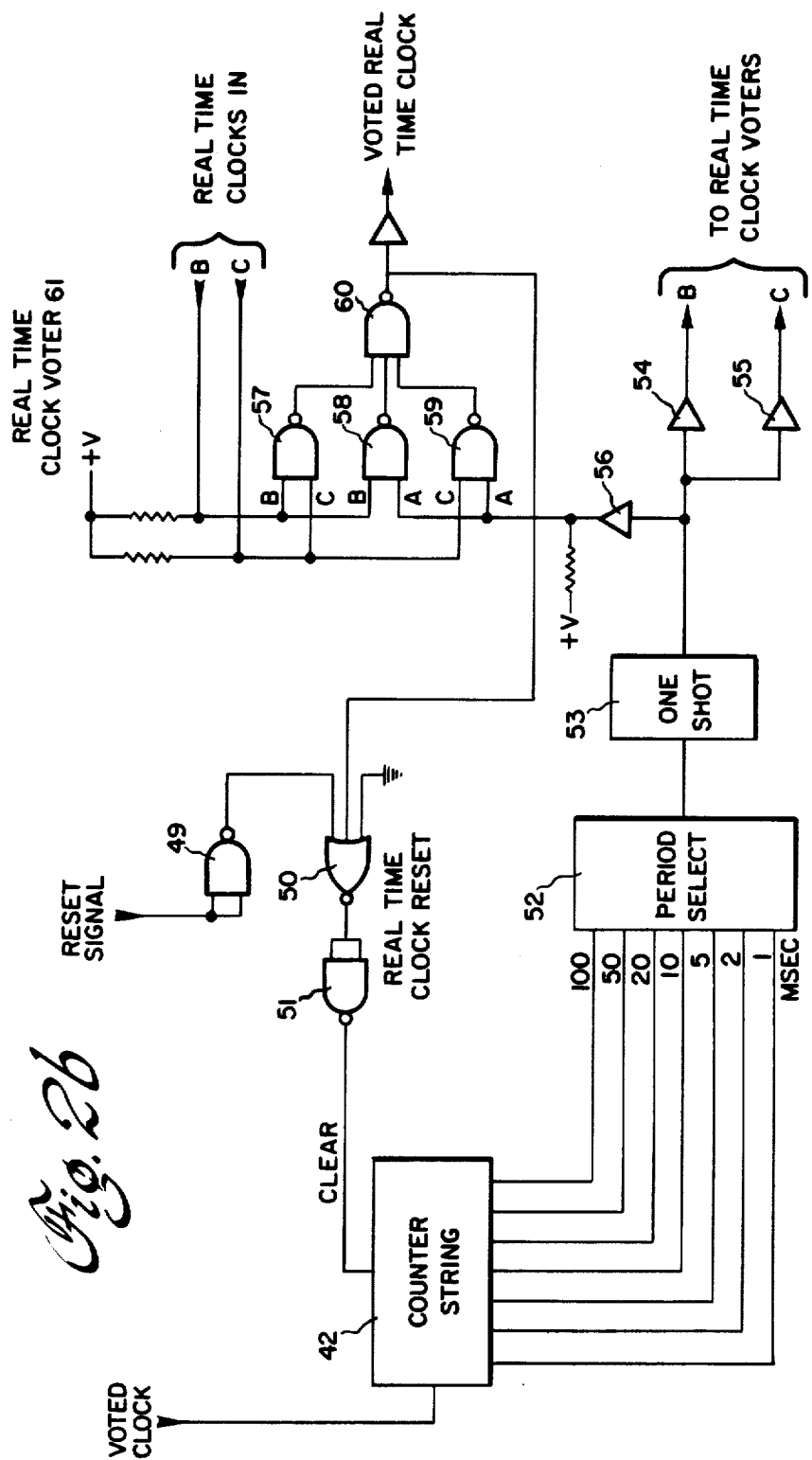

FIGS. 2a and 2b are a simplified schematic of the first of the three identical subcircuits and indicates how the various functions are implemented. A 5 megahertz master clock signal is generated in each subcircuit using a TTL (transistor-transistor logic) crystal oscillator that has as input its own signal as well as the signals from the other two subcircuit clocks. These inputs are majority voted, producing an output clock with an average frequency of the three crystals used. The majority voter is comprised of three two-input NAND gates 15–17 and a three-input NAND gate 18. Clock signals A and B are fed to the first, clocks A and C to the second, and clocks B and C to the third. The logic output of the voter is AB+AC+BC. When all three clocks are running, gate 18 has a logic One output and a voltage pulse is applied to the crystal 19. If master clock B or master clock C fails, gate 18 still has a logic One output and a pulse of voltage is developed. The high frequency oscillator also is conventional and is comprised of two three-input NAND gates 18 and 20, the latter serving as a buffer, and crystal 19. A feedback network composed of series resistors 21 and 22 and capacitor 23 in parallel with the latter, sets the bias point of the buffer. Two inputs of NAND gate 20 are connected to the junction of the resistors, and the third to the crystal itself. The voted master clock pulses are fed back to a NAND gate 24 which is connected as an inverter, and hence to the majority voter. The A clock pulses are also presented to inverters 25 and 26, then to the voted master clocks in subcircuits 10B and 10C. The B and C clock input lines are connected through pull up resistors 27 to a source of voltage +V, and are held at a logic One when nothing is there.

To ensure synchronization of the three subcircuit counters on initial power up, the master clock signal and the counter are inhibited by timeout circuitry 28. The time out, for initial power up, requires all three power supplies to be operational to prevent initial operation with a faulty supply. The time out period is set to ensure that the last supply turned on stabilizes before enabling the countdown. At start up, voltage (typically 5 volts) is applied to a resistance voltage divider 29 whose junction is connected to the non-inverting input of a voltage comparator 30, and to the series combination of a resistor 31 and capacitor 32 whose junction is connected to the inverting input. The voltage at the first input rises quickly and at the second input more slowly, and after a designated time the comparator output changes state. The timeout signal is passed through a non-inverting gate 33 to a three-input NOR gate 34, to which the B and C "true" timeout signals are supplied. The NOR gate produces an output when all three timeout signals are high indicating that all power supplies are turned on and stabilized. The A signal is fed to non-inverting gates 35 and 36 and hence to the B and C power up timeout circuitry.

When the power up timeout signal becomes true, the master clock is gated to the counters and to the reset and clock output circuit 37. The output signal of NOR gate 34 is coupled to the J input of a JK flip-flop 38, the Q output becomes high and is one input to a NAND gate 39. The inverted polarity voted master clock pulses from an inverter 40 are presented to this gate and to the flip-flop. Voted master clock pulses are not gated until the Q output comes up, at the rising edge of the first master clock pulse after the J input goes high due to power supply time out, latching the output signal of NOR gate 34 and locking the clock on enable, so that loss of a power supply (other than its own) will not disable the counter, maintaining the real time clock. Voted master clock pulses are passed to a non-inverting gate 41, which is a buffer, and transmitted to counter string 42 and to a two-input NAND gate 43. If master clock 11a is to be used as the processor clock, the voted master clock pulses are outputted at this point and transmitted to the processor (see FIG. 3) and are the processor clock pulses.

Reset and clock output circuit 37 maintains a reset signal for the counter and processor until four master clock pulses are output. This is done to maintain compatibility with Intel processors, in instances where the master clock is used as the processor clock and the reset line is applied to the processor. This allows processor startup as well as countdown to begin in unison for all three subcircuits, since the master clocks are in phase lock and the time out also occurs in unison. Master clock pulses gated by NAND gate circuit 43 are sent to a reset timeout counter 44 and to a reset JK flip-flop 45. This counter becomes active when the output of an inverter 46 goes high due to the output of NOR gate 34 going low after power time out. The $\overline{Q}$ output of flip-flop 45 is the second input to NAND gate 43. After four clock pulses are counted, the output of counter 44 goes high; this is the J input of flip-flop 45 and the Q and $\overline{Q}$ outputs change state. The reset signal Q produced in this way is sent to a non-inverting gate 47 and hence to the processor (see FIG. 3), and also to the real time clock reset. The $\overline{Q}$ output inhibits further counting. Flip-flops 38 and 45 are cleared on power up simultaneously by a RC timing circuit 48.

Referring to FIG. 2b, the reset signal (high) is fed to an inverter 49 and the inverted signal is sent to a NOR gate 50, the output of which is fed to an inverter 51 which applies the reset signal to the counter and clears it. Count down in all the counter strings 42 in all subcircuits is synchronized by the reset signal going low after the four counts of counter 44. Counter string 42 in one implementation is made up of 8 binary counters, and produces sets of real time clock pulses with different time periods, in particular 1, 2, 5, 10, 20, 50 and 100 milliseconds. These various time periods are input to an 8:1 period select or data selector 52. The desired real time period is chosen by means of a dip switch input to the selector.

The selected set of real time clock pulses are applied to a pulse shaper in the form of one shot, monostable multivibrator 53 that provides constant width, 100 microsecond pulses at the desired period. This set of pulses is presented to non-inverting gates 54 and 55 and broadcast to the other subcircuits, to the B and C real time voters.

The selected set of real time clock pulses are also sent to non-inverting gate 56 and to a majority voter composed of the four NAND gates 57–60. This real time clock voter 61 or output voter receives the three pulses and produces the voted real time clock, the subcircuit output. If the B or C clocks fail, there is still an output from the subcircuit. The time period of these real time clock pulses determines how much time is spent on a task performed by the microcomputer. The voted clock signal is fed back to the NOR gate 50 to be used as a dynamic reset for the counter. For instance, if one of the three subsystems has been removed from service and then brought back on line with the other two operational (a "hot start"), the master clock will phase lock immediately. However, there is no guarantee as to where it starts real time counting with respect to the two others, which are still producing in phase real time clocks. These in phase clocks applied to the just powered up circuit provide the dynamic reset to the counter 42 to ensure lock within one real time clock period.

Figure 3:
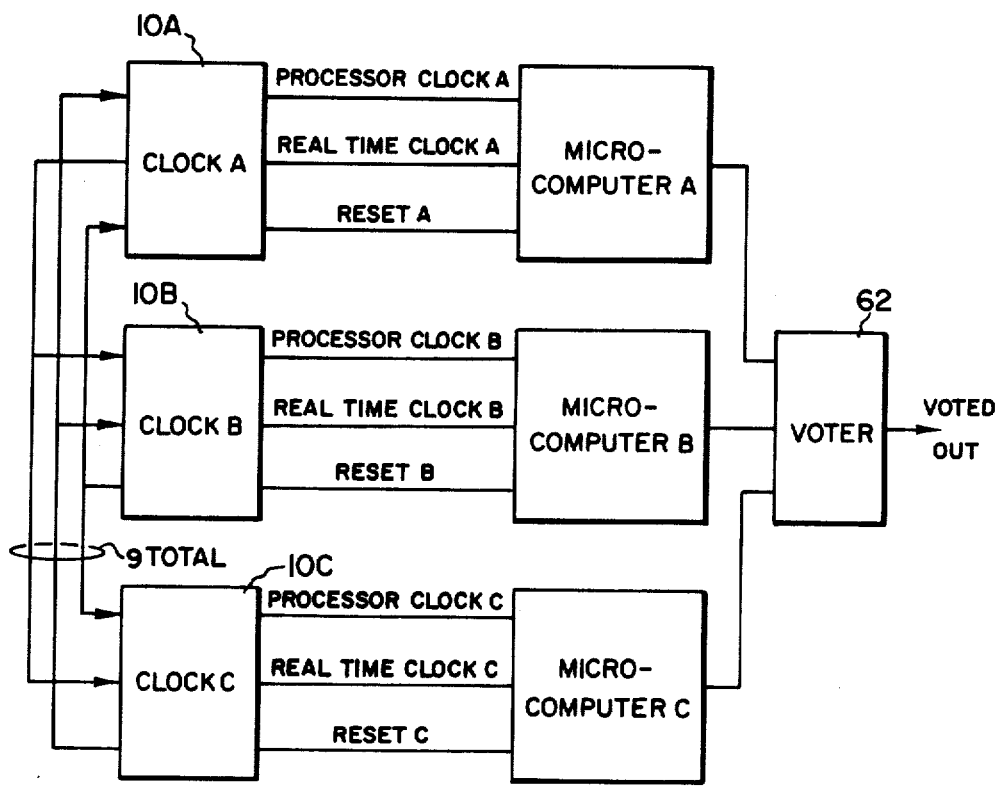
FIG. 3 is a block diagram of a TMR microcomputer system incorporating in each channel a real time clock that is also the processor clock.

The block diagram of a triple modular redundancy (TMR) microcomputer system is given in FIG. 3. There are a total of nine interconnections between clocks A, B and C as shown in FIG. 1. The first clock, taken as an example, sends to the microcomputer processor clock pulses (the output of gate 41 in FIG. 2a), real time clock pulses (the output of voter 61 in FIG. 2b), and the processor reset signal (the output of gate 47 in FIG. 2a). All three clocks produce all three of these outputs even if one subcircuit fails and is not functioning. The system majority voter 62 receives signals from the three microcomputers and generates a system voted out signal.

The extension of these principles to n (n=3, 5, 7, etc.) real time clocks such that proper operation is maintained with the failure of (n-1)/2 of them, is readily seen. As long as there is a majority of good operating real time clocks, real time clock outputs from every subcircuit are assured. In conclusion, failure of a clock will not cause a system failure, failure of a power supply or processor will not cause a clock supplying other processors to fail, and the time base of real time clock signals is variable.

While the invention has been particularly shown and described with reference to a preferred embodiment thereof, it will be understood by those skilled in the art that various changes in form and details may be made therein without departing from the spirit and scope of the invention.

The invention claimed is:

1. A fault-tolerant real time clock for triple modular redundant computer systems comprising:
   three substantially identical subcircuits that have separate power supplies and are interconnected to assure outputting of voted real time clock pulses from all three and continued operation with failure of one subcircuit, each subcircuit including
   a majority voted master clock which generates voted high frequency master clock pulses and has, as inputs, its own output signal and the output signals from the other two subcircuit master clocks;
   counter means to which said voted master clock pulses are gated for producing sets of real time clock pulses that have different time periods;
   power up timeout means having inputs from all of said subcircuits and that temporarily inhibits gating of said voted master clock pulses to said counter means until each subcircuit produces a power up timeout signal and an output signal is generated indicating that all of said power supplies are turned on and stabilized, and means for latching said last-mentioned output signal so that loss of a subcircuit power supply other than its own will not disable said counter means;
   means for outputting said voted master clock pulses to a processor to use said master clock as a processor clock;
   means for selecting one of said sets of real time clock pulses; and
   a real time clock majority voter to generate said voted real time clock pulses that are outputted to said processor and which has as inputs its own selected real time clock pulses and those outputted by the other subcircuits.

2. The clock of claim 1 wherein each subcircuit further includes reset means for generating a reset signal for said counter means and said processor which is maintained until a predetermined number of said voted master clock pulses are counted.

3. The clock of claim 2 wherein each subcircuit further includes means for feeding back said voted real time clock pulses to said reset means to dynamically reset said counter means while the other two subcircuits are operating.

4. A fault-tolerant real time clock for modular redundant computer systems comprising:
   n substantially identical subcircuits, where n=3, 5, 7, etc., that have separate power supplies and are interconnected to assure outputting of voted real time clock pulses from all and continued operation with the failure of (n-1)/2 subcircuits, each subcircuit including
   a voted master clock which generates voted high frequency master clock pulses and has, as inputs, its own output signal and the other subcircuit master clock output signals;
   counter means to which said voted master clock pulses are gated and which generates sets of real time clock pulses with different time periods;
   power up timeout means having inputs from all of said subcircuits and that temporarily inhibits gating of said voted master clock pulses to said counter means and to reset means for said counter means until each subcircuit produces a power up timeout signal and an output signal is generated indicating that all of said power supplies are turned on and stabilized, and means for latching said last-mentioned output signal so that loss of a subcircuit power supply other than its own will not disable said counter means;
   means for selecting one of said sets of real time clock pulses; and
   a real time clock majority voter to generate said voted real time clock pulses that are outputted to a processor and which has as inputs its own selected real time clock pulses and those outputted by the other subcircuits.

5. The clock of claim 4 wherein, in each of said subcircuits, said reset means sends a reset signal to said counter means until a designated number of said voted master clock pulses are counted.

6. The clock of claim 5 wherein each of said subcircuits further includes means for outputting said voted master clock pulses to said processor to use as the processor clock and for outputting said reset signal to said processor.

* * * * *